US012804251B2

(12) United States Patent
Choi

(10) Patent No.: US 12,804,251 B2
(45) Date of Patent: Nov. 17, 2026

(54) ELECTRONIC DEVICE FOR OBTAINING IMAGE AT USER-INTENDED MOMENT AND METHOD FOR CONTROLLING THE SAME

(71) Applicant: SAMSUNG ELECTRONICS CO., LTD., Suwon-si (KR)

(72) Inventor: Sungsoo Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/054,337

(22) Filed: Feb. 14, 2025

(65) Prior Publication Data

US 2025/0203195 A1 Jun. 19, 2025

Related U.S. Application Data

(63) Continuation of application No. 17/988,207, filed on Nov. 16, 2022, now Pat. No. 12,238,409, which is a (Continued)

(30) Foreign Application Priority Data

Nov. 17, 2021 (KR) ........................ 10-2021-0158293
Dec. 14, 2021 (KR) ........................ 10-2021-0179133

(51) Int. Cl.
*H04N 23/63* (2023.01)
*G06F 3/16* (2006.01)

(Continued)

(52) U.S. Cl.
CPC ......... *H04N 23/632* (2023.01); *H04N 23/667* (2023.01)

(58) Field of Classification Search
CPC .. H04N 23/632; H04N 23/667; H04N 23/617; H04N 5/77; H04N 23/60;

(Continued)

(56) References Cited

U.S. PATENT DOCUMENTS 10,147,216 B1 * 12/2018 Miao ........................ G06F 18/24
10,445,586 B2 * 10/2019 Sinha ........................ G06F 18/22

(Continued)

FOREIGN PATENT DOCUMENTS

JP 2019118098 A 7/2019
JP 2020136898 A 8/2020

(Continued)

OTHER PUBLICATIONS

Extended European Search Report Issued In EP Application No. 22895954.0-1207, Mail Date Oct. 18, 2024, 9 Pages.

(Continued)

*Primary Examiner* — Ahmed A Berhan
(74) *Attorney, Agent, or Firm* — CANTOR COLBURN LLP

(57) ABSTRACT

The disclosure relates to an artificial intelligence (AI) system that simulates a function, such as cognition and judgment, of a human brain using a machine learning algorithm, such as deep learning, and an application thereof. According to an embodiment, an electronic device may include a touchscreen, a camera, a memory, and a processor, wherein the processor may receive information about an image capturing situation from a user, may obtain a target image based on the information about the image capturing situation using a first artificial intelligence module stored in the memory, may obtain feature information included in the target image using a second artificial intelligence module stored in the memory, may store the feature information in the memory, and may store an image related to the feature information in the memory based on obtaining the image related to the feature information through the camera.

18 Claims, 14 Drawing Sheets

Related U.S. Application Data continuation of application No. PCT/KR2022/017475, filed on Nov. 8, 2022.

(51) Int. Cl.

| | |
|---|---|
| ***G06N 20/00*** | (2019.01) |
| ***G06V 10/74*** | (2022.01) |
| ***H04N 23/667*** | (2023.01) |

(58) Field of Classification Search

CPC ........... H04N 23/64; G06F 3/041; G06F 3/16; G06N 20/00; G06N 20/20; G06T 1/00; G06T 7/66; G06V 10/761; G06V 10/764; G06V 10/82; G06V 20/41

See application file for complete search history.

(56) References Cited

U.S. PATENT DOCUMENTS

| | | | | |
|---|---|---|---|---|
| 10,979,625 | B2 * | 4/2021 | Lee | H04N 23/675 |
| 2011/0029301 | A1 | 2/2011 | Han et al. | |
| 2016/0286132 | A1 | 9/2016 | Kim et al. | |
| 2018/0181827 | A1 | 6/2018 | Kim et al. | |
| 2018/0302568 | A1 | 10/2018 | Kim et al. | |
| 2018/0376050 | A1 | 12/2018 | Endo | |
| 2019/0244017 | A1 | 8/2019 | Tai et al. | |
| 2019/0253615 | A1 | 8/2019 | Fukuya et al. | |
| 2020/0184968 | A1 | 6/2020 | Han et al. | |
| 2021/0263961 | A1 | 8/2021 | Kemertas | |
| 2022/0101653 | A1 | 3/2022 | Watanabe | |
| 2023/0156317 | A1 | 5/2023 | Choi | |

FOREIGN PATENT DOCUMENTS

| | | | |
|---|---|---|---|
| JP | 6829412 | B1 | 2/2021 |
| KR | 101876433 | B1 | 7/2018 |
| KR | 20180116574 | A | 10/2018 |
| KR | 20180119042 | A | 11/2018 |
| KR | 102052830 | B1 | 12/2019 |
| WO | 2021029648 | A1 | 2/2021 |

OTHER PUBLICATIONS

International Search Report and Written Opinion for International Application No. PCT/KR2022/017475; International Filing Date Nov. 8, 2022; Date of Mailing Feb. 17, 2023; 9 Pages.

* cited by examiner

ELECTRONIC DEVICE FOR OBTAINING IMAGE AT USER-INTENDED MOMENT AND METHOD FOR CONTROLLING THE SAME

CROSS-REFERENCE TO RELATED APPLICATION

This application is a continuation application of U.S. application Ser. No. 17/988,207, filed on Nov. 16, 2022, claiming priority under § 365(c), of PCT International Application No. PCT/KR2022/017475 designating the United States, filed on Nov. 8, 2022, in the Korean Intellectual Property Receiving Office and claiming priority to 10-2021-0179133, filed on Dec. 14, 2021, and Korean Patent Application No. 10-2021-0158293, filed on Nov. 17, 2021, the disclosures of all of which are incorporated by reference herein in their entireties.

BACKGROUND

Technical Field

Various embodiments of the disclosure relate to an electronic device for obtaining an image at a user-intended moment and a method for controlling the same.

Description of Related Art

An artificial intelligence (AI) system is a computer system that realizes human-level intelligence, and is a system in which a machine autonomously learns, makes a judgment, and becomes smarter unlike an existing rule-based smart system. As the AI system is used, the AI system improves in recognition rate and more accurately understands user preferences, and thus existing rule-based smart systems are gradually being replaced by deep learning-based AI systems.

Artificial intelligence technology includes machine learning (deep learning) and element technologies using machine learning.

Machine learning is an algorithm technology for autonomously categorizing/learning characteristics of input data, and an element technology is a technology for simulating a function, such as cognition and judgment, of a human brain using a machine learning algorithm, such as deep learning, and includes technical fields, such as linguistic understanding, visual understanding, inference/prediction, knowledge expression, and operation control.

Artificial intelligence technology can be applied to one or more fields, such as the following examples. Linguistic understanding is a technology for recognizing and applying/processing human language/text, and includes natural language processing, machine translation, dialogue system, question and answer, and speech recognition/synthesis. Visual understanding is a technology for recognizing and processing an object like human vision, and includes object recognition, object tracking, image search, human recognition, scene understanding, spatial understanding, image enhancement, and the like. Inference and prediction is a technology for making logical inference and prediction by judging information, and includes knowledge/probability-based inference, optimization prediction, preference-based planning, suggestion, and the like. Knowledge expression is a technology for automatically processing human experience information into knowledge data, and includes knowledge construction (data generation/classification) and knowledge management (data utilization). Operation control is a technology for controlling autonomous driving of a vehicle and movement of a robot, and includes motion control (navigation, collision, and driving), manipulation control (action control), and the like.

Many image obtaining operations using a camera depend on a user's manipulation. However, it is difficult for the user to input a manipulation for capture at a moment the user intends to capture the image, and a delay after a manipulation input and shaking at the manipulation input makes it difficult to obtain a high-quality image at an intended moment.

Although there is a preview or a function of capturing an image satisfying a specific condition while taking a video, this function also relies on the user to input a user manipulation to take a video at a moment the user intends to capture the video.

An AI-driven autosuggestion technology (e.g., single-take mode) for capturing an image while taking a video using artificial intelligence suggests an image to a user, based on a criterion, such as no blurring, good color, and good composition, predetermined by a developer but has difficulty reflecting each user's taste.

The disclosure relates to an electronic device for obtaining an image at a user-intended moment and a method for controlling the same.

SUMMARY

According to an embodiment, an electronic device may include a camera, a memory, and a processor, wherein the processor may receive information about an image capturing situation from a user, may obtain a target image based on the information about the image capturing situation using a first artificial intelligence module stored in the memory, may obtain feature information included in the target image using a second artificial intelligence module stored in the memory, may store the feature information in the memory, and may store an image related to the feature information in the memory when obtaining the image related to the feature information through the camera.

According to an embodiment, a method for controlling an electronic device may include receiving information about an image capturing situation from a user, obtaining a target image based on the information about the image capturing situation using a first artificial intelligence module stored in a memory, obtaining feature information included in the target image using a second artificial intelligence module stored in the memory, storing the feature information in the memory, and storing an image related to the feature information in the memory when obtaining the image related to the feature information through a camera.

According to an embodiment, a method may include: capturing a video in a single-take mode, the single take mode collecting a plurality of frames for a predetermined time, compressing the plurality of frames into low-dimensional vectors, comparing feature information for each of the plurality of frames, wherein the feature information is obtained from a reference database based on information about an image capturing situation input from a user, extracting at least one frame including a feature stored in the reference database among the plurality of frames collected for the predetermined time, and storing the extracted at least one frame or suggesting the extracted at least one frame to the user.

An electronic device according to various embodiments of the disclosure may obtain an image at a user-desired moment and may provide the image for a user.

An electronic device according to various embodiments of the disclosure may obtain an image to be provided for a user in further consideration of user-desired feature information without affecting a pipeline of an existing single-take mode.

DETAILED DESCRIPTION

Figure 1:
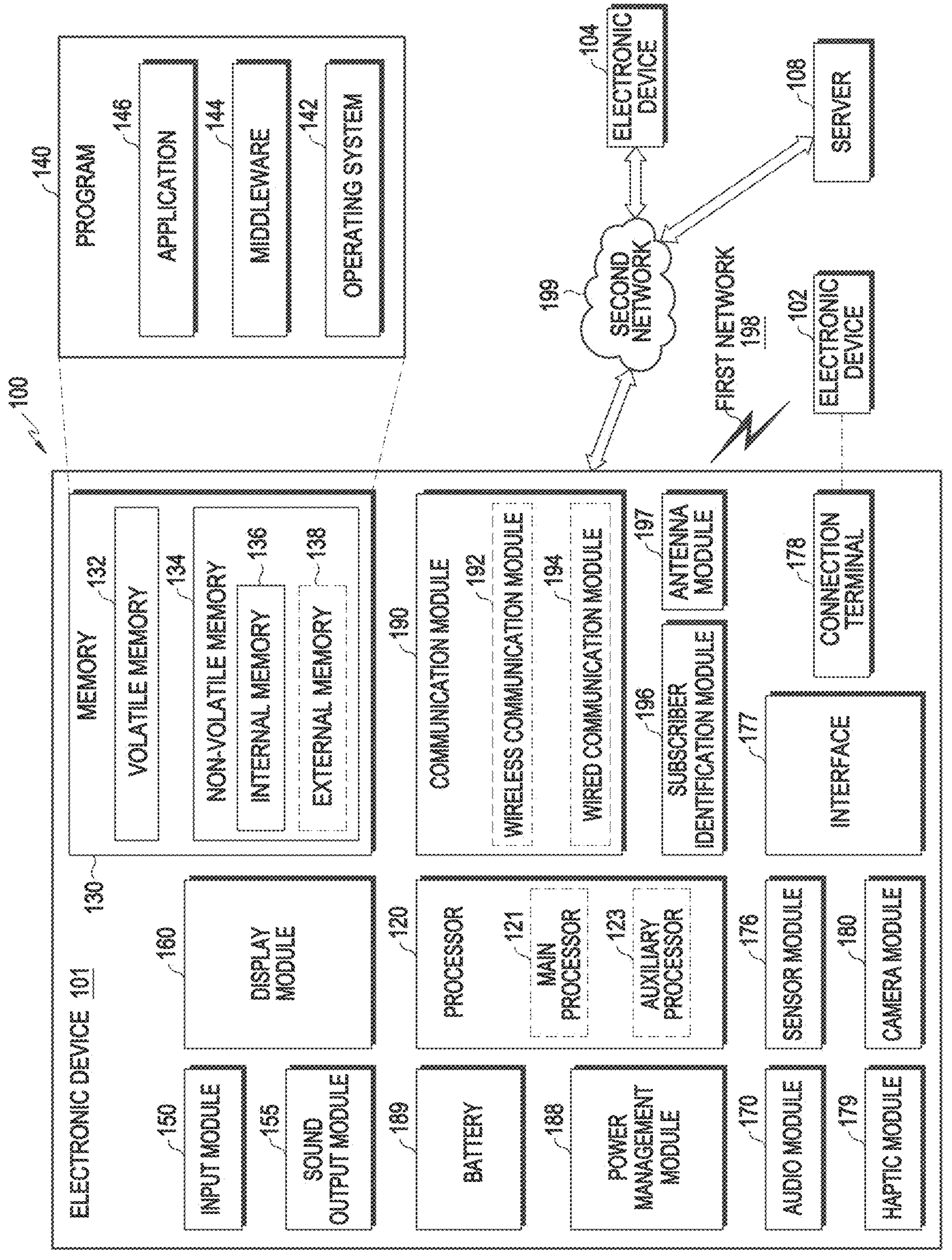
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence module processing. An artificial intelligence module may be generated by machine learning. Such learning may be performed, e.g., by the electronic device 101 where the artificial intelligence module is performed or via a separate server (e.g., the server 108). Learning algorithms may include, but are not limited to, e.g., supervised learning, unsupervised learning, semi-supervised learning, or reinforcement learning. The artificial intelligence module may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence module may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
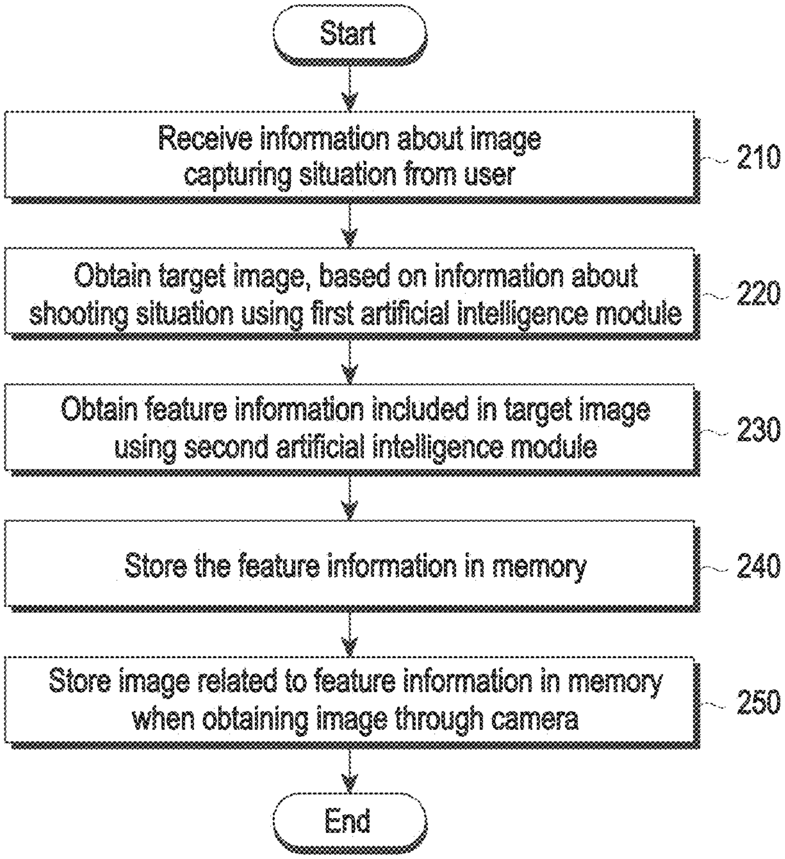
FIG. 2 is a flowchart illustrating an operation of an electronic device obtaining an image at a user-intended moment according to an embodiment.

FIG. 2 is a flowchart illustrating an operation of an electronic device obtaining an image of a user-intended moment according to an embodiment.

Referring to FIG. 2, according to an embodiment, in operation 210, the electronic device (e.g., the electronic device 101 of FIG. 1 or the processor 120 of FIG. 1) may receive information about an image capturing situation from a user. For example, the electronic device may receive the information about the image capturing situation through at least one of a voice input from the user, a drawing input from the user, an image input, and/or the like, including combinations and/or multiples thereof.

For example, the electronic device may receive the user's voice (e.g., "I want to take a picture of a dog with its eyes open and its tongue stuck out in a single-take mode.") through a microphone (e.g., the input module 150 of FIG. 1) as the information about the image capturing situation. According to an embodiment, the electronic device may receive the user's drawing (e.g., a picture of a dog's face with its eyes open and its tongue stuck out) input through a touchscreen (e.g., the display module 160 of FIG. 1) as the information about the image capturing situation. According to an embodiment, the electronic device may receive an input to select one image from among a plurality of images stored in a memory (e.g., the memory 130 of FIG. 1) by the user through the touchscreen as the information about the image capturing situation.

According to an embodiment, when at least one of a target sound and a target action is further included in the information about the image capturing situation, the electronic device may store at least one of the target sound and the target action in the memory. According to an embodiment, the target sound may refer to a sound that the user intends to capture. For example, when a user voice input "I want a video of a dog barking" is received as the information about the image capturing situation, a dog barking sound may be the target sound.

According to an embodiment, the target action may refer to an action that the user intends to capture. For example, when a user voice input "I want a video of a dog barking"

is received as the information about the image capturing situation, a dog barking action may be the target action.

According to an embodiment, the electronic device may obtain compressed feature information about a moment when the user intends to capture an image (referred to as an "user-intended moment"), thereby securing the memory and securing efficiency in operation time of the electronic device. Hereinafter, an operation of obtaining compressed feature information will be described.

According to an embodiment, in operation 220, the electronic device may obtain a target image, based on the information about the image capturing situation, using a first artificial intelligence module. According to an embodiment, the first artificial intelligence module may be an artificial intelligence network based on a U-Net or generative adversarial network (GAN). According to an embodiment, the first artificial intelligence module can use, alternatively or additionally, other types of suitable machine learning techniques to obtain the target image.

According to an embodiment, the target image may include static feature information that the user wants to capture. For example, the static feature information may be a feature that can be included in one picture, for example, a subject to be shot spreading out the arms or the forehead being seen.

According to an embodiment, a voice input of the user, a drawing input of the user, or an image selected by the user may be input data to the first artificial intelligence module, and output data from the first AI module based on the input data may be the target image. For example, the target image may be a sketch image.

According to an embodiment, the electronic device may display the target image output from the first artificial intelligence module on the touchscreen.

According to an embodiment, when receiving a user manipulation to edit the target image through the touchscreen on which the target image is displayed, the electronic device may edit the target image, based on the user manipulation, and may store the edited target image in the memory. For example, when the user intends an image including a subject's pose having both arms spreading out but the target image includes a subject's pose of both arms being slightly bent and open, the user may edit the target image to make both arms spread out through a drawing input through the touchscreen, and the electronic device may store the edited target image in the memory. According to an embodiment, the edited target image may be used to retrain the first artificial intelligence module.

According to an embodiment, in operation 230, the electronic device may obtain feature information included in the target image using a second artificial intelligence module. For example, the feature information may include a low-dimensional feature vector. For example, the low-dimensional feature vector may include a one-dimensional feature vector.

According to an embodiment, input data to the second artificial intelligence module may be the target image, and output data from the second artificial intelligence module based on the input data may be the low-dimensional feature vector. For example, the low-dimensional feature vector may be a combination of letters and/or numbers including feature information of an image.

According to an embodiment, when the target image is edited by the user, the electronic device may input the edited target image to the second artificial intelligence module, thereby obtaining a low-dimensional feature vector for the edited target image.

According to an embodiment, in operation 240, the electronic device may store the feature information output from the second artificial intelligence module in the memory (e.g., the memory 130 of FIG. 1).

According to an embodiment, in operation 250, based on an image related to the feature information being obtained through a camera (e.g., the camera module 180 of FIG. 1), the electronic device may store the image in the memory.

According to an embodiment, the operation of obtaining the image related to the feature information through the camera may include an operation of obtaining a frame related to the feature information among a plurality of frames obtained through the camera or an operation of obtaining an image related to the feature information through a preview of a camera application.

According to an embodiment, the electronic device may display the image related to the feature information on the touchscreen. For example, the electronic device may store a plurality of images related to the feature information in a buffer, may display the plurality of images on the touchscreen, and may store at least one image selected by the user in the memory.

According to an embodiment, when at least one of the target sound or the target action is stored in the memory and a video related to at least one of the target sound or the target action is obtained through the camera, the electronic device may store the video in the memory.

According to an embodiment, the electronic device may classify at least one of sounds or actions included in a plurality of frames obtained through the preview of the camera application, and may obtain a video related to at least one of the target sound or the target action through similarity between at least one of the classified sounds or actions and at least one of the target sound or the target action.

According to an embodiment, the electronic device may classify at least one of sounds or actions included in a plurality of frames stored in the memory, and may obtain a video related to at least one of the target sound or the target action through similarity between at least one of the classified sounds or actions and at least one of the target sound or the target action.

According to an embodiment, the electronic device may display the video related to at least one of the target sound or the target action on the touchscreen (e.g., the display module 160 of FIG. 1). For example, the electronic device may store a plurality of videos related to at least one of the target sound or the target action in the buffer, may display thumbnails of the plurality of videos on the touchscreen, and may play a video of a thumbnail selected by the user. According to an embodiment, the electronic device may store a video of at least one thumbnail selected by the user among the plurality of thumbnails of the video in the memory.

Figure 3:
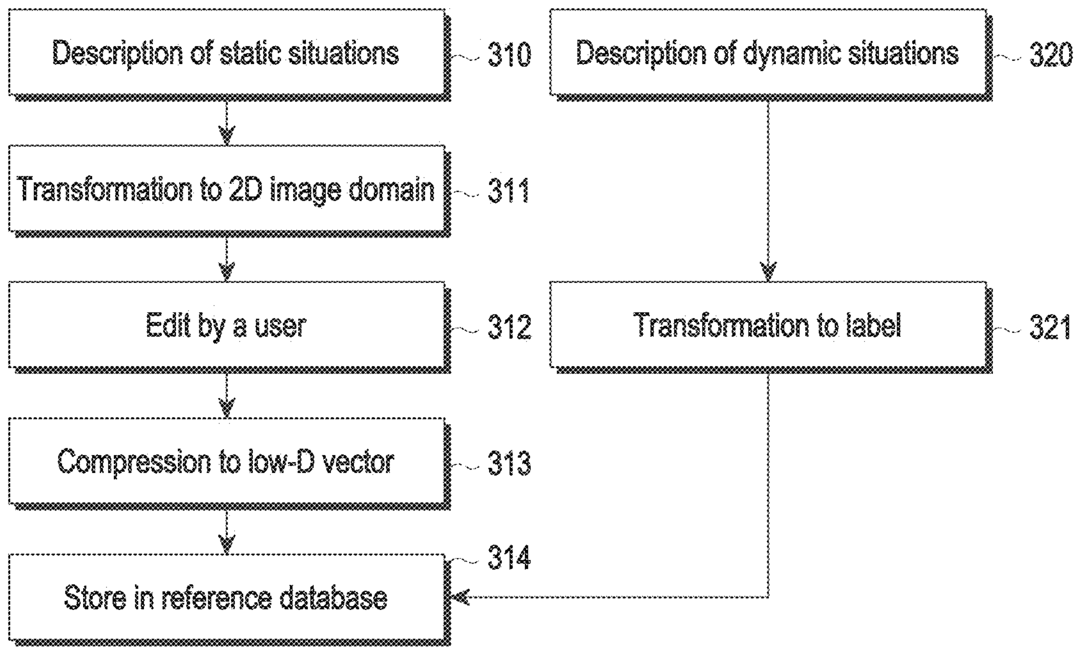
FIG. 3 illustrates an operation of an electronic device storing feature information about a user-intended moment according to an embodiment.

FIG. 3 illustrates an operation of an electronic device storing feature information about a user-intended moment according to an embodiment.

According to an embodiment, in operation 310, the electronic device (e.g., the electronic device 101 of FIG. 1 or the processor 120 of FIG. 1) may identify that information about an image capturing situation received from a user includes a static situation. For example, the static situation may refer to a pose or form that can be included in one picture, for example, both of a subject's arms spreading out or the subject's forehead being seen, and the electronic device may suggest an image including a static situation intended by the user.

According to an embodiment, in operation 320, the electronic device may identify that the information about the image capturing situation received from the user includes a dynamic situation. For example, the dynamic situation may be a situation including a sound or an action, such as jumping, clapping, or dog barking, and the electronic device may suggest a video including a sound or an action intended by the user.

By distinguishing between a static situation expressible in a single image and a dynamic situation not expressible in a single image, the user may intuitively describe a situation and may increase accuracy of compression of context information intended by the user.

According to an embodiment, in operation 311, when the information about the image capturing situation received from the user includes the static situation, the electronic device may perform transformation to a 2D image domain. For example, performing the transformation to the 2D domain may refer to obtaining a target image including the information about the image capturing situation.

According to an embodiment, the electronic device may obtain the target image using a first artificial intelligence module regardless of whether the information about the image capturing situation received from the user is the user's voice, the user's drawing input, or the user's image selection. For example, the first artificial intelligence module may be an artificial intelligence network based on a U-Net or GAN.

According to an embodiment, in operation 312, the electronic device may edit the target image by a user manipulation. According to an embodiment, when there is an error in the target image output from the first artificial intelligence module or when the target image does not adequately express a situation intended by the user (e.g., when the user intends that a subject have both arms slightly raised but the target image shows that the subject's arms are raised with the hands slightly bent), the electronic device may edit the target image through manipulation by the user. For example, the user may edit the target image through a drawing input on the target image. According to an embodiment, when the target image does not need editing, operation 312 may be omitted.

As described above, since compression in operation 313 is performed after the target image of the 2D domain is obtained regardless of whether the information about the image capturing situation received from the user is the user's voice, the user's drawing input, or the user's image selection, accuracy of a compression operation may be improved.

According to an embodiment, in operation 313, the electronic device may extract feature information included in the target image and may compress the feature information into a low-D vector to determine a degree to which the feature information included in the target image and a frame obtained through a camera (e.g., the camera module 180 of FIG. 1) are matched. For example, the electronic device may extract and compress the feature information using a second artificial intelligence module (e.g., a neural encoder) trained to extract and compress the feature information of the target image.

According to an embodiment, the electronic device may input the target image to the second artificial intelligence module, and may compress the feature information of the target image into a low-dimensional (e.g., one-dimensional) feature vector.

According to an embodiment, in operation 314, the electronic device may store the feature information in a memory (e.g., the memory 130 of FIG. 1). For example, the electronic device may store the feature information in a reference database of feature information stored in the memory.

As described above, by compressing and storing the feature information of the target image, information loss of data may be minimized and data management may be efficiently performed in terms of capacity or processing speed.

According to an embodiment, in operation 321, when the information about the image capturing situation received from the user includes the dynamic situation, the electronic device may perform transformation to a label. For example, performing the transformation to the label may refer to transforming the information about the image capturing situation to a simple label form, such as walking or a clapping sound, when the information about the image capturing situation includes a target sound or a target action.

According to an embodiment, in operation 314, the electronic device may store the transformed label in the memory. For example, the electronic device may store the label in the reference database of the feature information stored in the memory.

Figure 4:
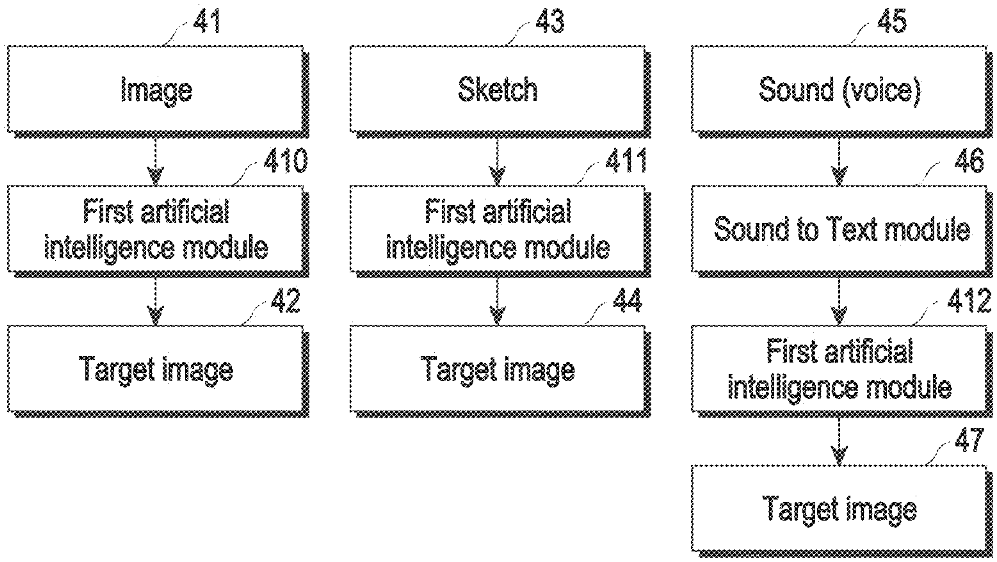
FIG. 4 illustrates an operation of an electronic device obtaining a target image at a user-intended moment according to an embodiment.

FIG. 4 illustrates an operation of an electronic device obtaining a target image of a user-intended moment according to an embodiment.

According to an embodiment, referring to FIG. 4, when receiving an image 41 as information about an image capturing situation from a user, the electronic device (e.g., the electronic device 101 of FIG. 1 or the processor 120 of FIG. 1) may obtain a target image 42 through a first artificial intelligence module 410. For example, the first artificial intelligence module 410 may be a U-Net or GAN-based artificial intelligence network, which may be trained to transform an image into a sketch image. According to an embodiment, when the user selects an image including a pose or form desired to be captured from among a plurality of images through a touchscreen (e.g., the display module 160 of FIG. 1), the electronic device may input the selected image to the first artificial intelligence module 410 and may obtain the target image 42 as output data.

According to an embodiment, when receiving a drawing input (e.g., a sketch) 43 as information about an image capturing situation from the user, the electronic device may obtain a target image 44 through a first artificial intelligence module 411. For example, the first artificial intelligence module 411 may be a U-Net or GAN-based artificial intelligence network, which may be trained to transform a drawing image into a sketch image. According to an embodiment, when the user inputs a drawing including a pose or form desired to be captured through a touchscreen (e.g., the display module 160 of FIG. 1), the electronic device may input a drawing image to the first artificial intelligence module 411 and may obtain the target image 44 as output data.

According to an embodiment, when receiving a sound 45 (e.g., a voice) as information about an image capturing situation from the user, the electronic device may transform the sound 45 into text through a sound-to-text module 46. According to an embodiment, the sound-to-text module 46 includes a neural network trained convert sound to text, such as a speech-to-text deep learning neural network. According to an embodiment, the sound-to-text module 46 can implement natural language processing techniques.

According to an embodiment, the electronic device may obtain a target image 47 by inputting the transformed text from the sound to text module 46 into a first artificial intelligence module 412. For example, the first artificial intelligence module 412 may be a U-Net or GAN-based artificial intelligence network, which may be trained to transform text into a sketch image. According to an embodiment, when the user inputs a sound including a pose or form desired to be captured through a microphone (e.g., the input module 150 of FIG. 1), the electronic device may transform the sound into text, may input the text to the first artificial intelligence module 412 and may obtain the target image 47 as output data.

Figure 5A:
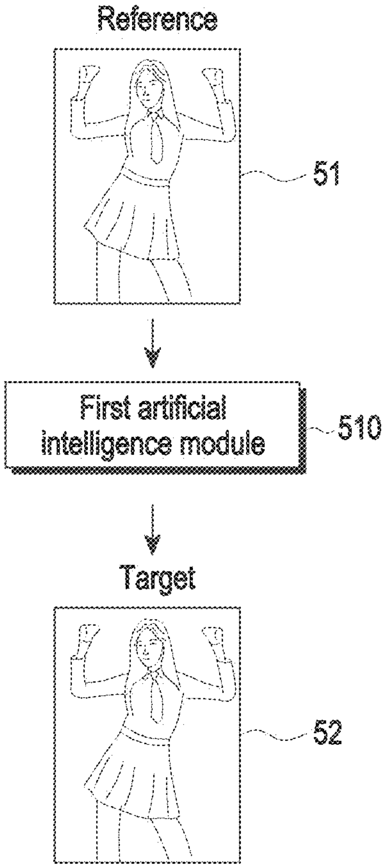
FIG. 5A illustrates an operation of training an artificial intelligence module to obtain a target image at a user-intended moment of an electronic device according to an embodiment.

FIG. 5A illustrates an operation of training an artificial intelligence module (e.g., a first artificial intelligence module) to obtain a target image at a user-intended moment of an electronic device according to an embodiment.

According to an embodiment, referring to FIG. 5A, the electronic device (e.g., the electronic device 101 of FIG. 1 or the processor 120 of FIG. 1) may train a U-Net or GAN-based first artificial intelligence module 510 that transforms a general photo 51 (e.g., "reference") into a sketch image 52 (e.g., "target"). According to an embodiment, the general photo 51 and the sketch image 52 represent training data used to train the first artificial intelligence module 510.

According to an embodiment, after training the first artificial intelligence module 510 with a suitable amount of training data or greater (e.g., enough training data to return satisfactory results (e.g., results with a probability of greater than a threshold amount)), the electronic device may implement the first artificial intelligence module 510 to perform inference.

Figure 5B:
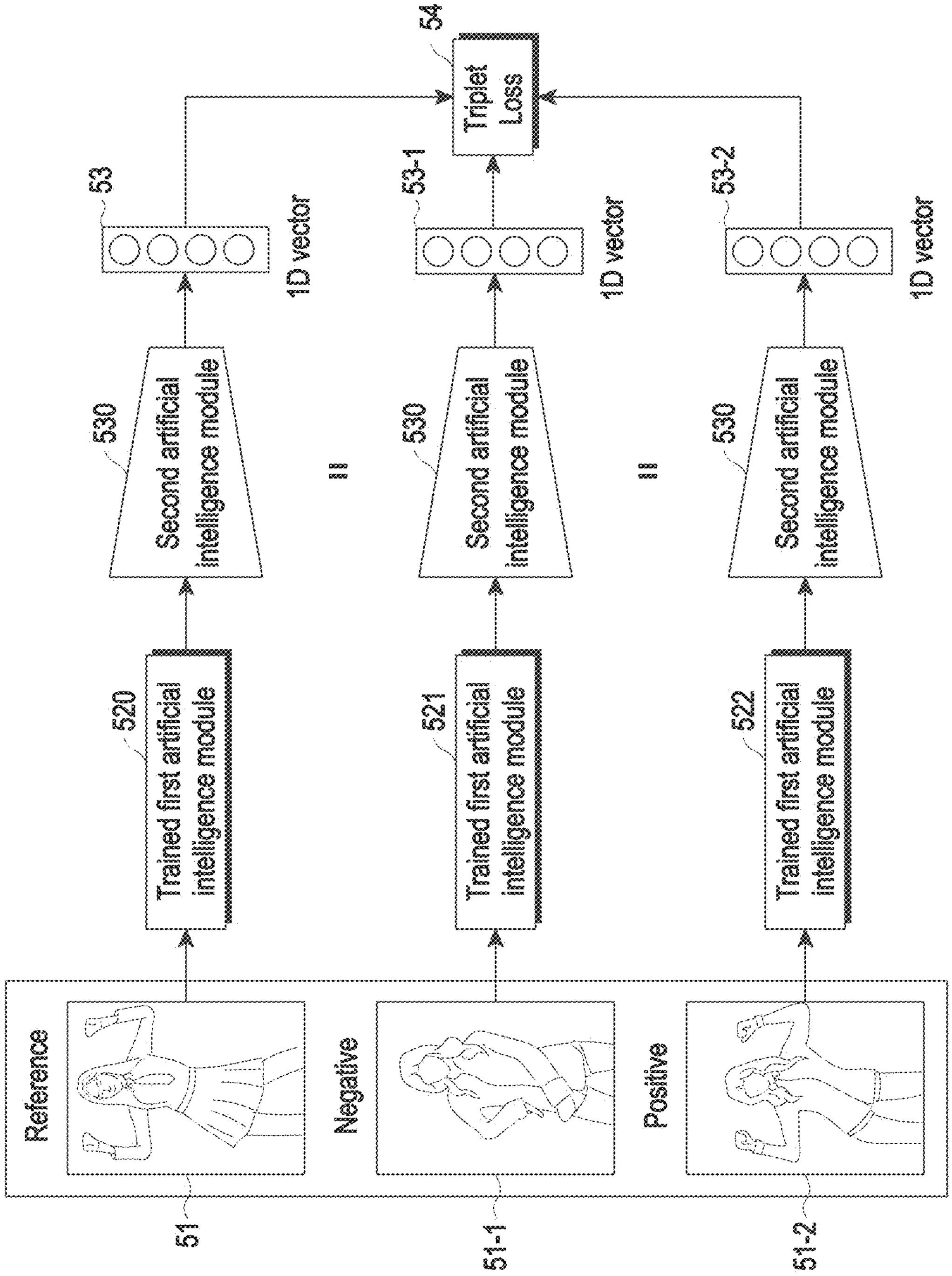
FIG. 5B illustrates an operation of training an artificial intelligence module to obtain feature information about a user-intended moment of an electronic device according to an embodiment.

FIG. 5B illustrates an operation of training an artificial intelligence module (e.g., a second artificial intelligence module) to obtain feature information about a user-intended moment of an electronic device according to an embodiment.

According to an embodiment, referring to FIG. 5B, the electronic device (e.g., the electronic device 101 of FIG. 1 or the processor 120 of FIG. 1) may train a second artificial intelligence module 530, based on triplet loss.

For example, the electronic device may input as training data a reference image 51, a negative image 51-1, and a positive image 51-2 which are prepared to trained first artificial intelligence modules 520, 521, and 522, respectively. For example, the negative image 51-1 may be an image of which a similarity to the reference image 51 is less than a configured value (e.g., a threshold), and the positive image 51-2 may be an image of which a similarity to the reference image 510 is equal to or greater than the configured value (e.g., the threshold). For example, the trained first artificial intelligence modules 520, 521, and 522 may be trained to transform an image into a sketch as shown in FIG. 5A.

According to an embodiment, target images of the reference image 51, the negative image 51-1, and the positive image 51-2 may be output respectively from the trained first artificial intelligence modules 520, 521, and 522, and each output target image may be input to a second artificial intelligence module 530. According to an embodiment, the second artificial intelligence module 530 may be a neural encoder for extracting and compressing feature information of a target image and/or other suitable machine learning technique.

According to an embodiment, the electronic device may obtain a triplet loss 54, which may be based on low-dimensional feature vectors 53, 53-1, and 53-2 of the respective target images output from the second artificial intelligence module 530, and may train the second artificial intelligence module 530 based on the obtained triplet loss 54. For example, the triplet loss 54 may be for training the second artificial intelligence model 530 such that the low-dimensional feature vector 53 for the reference image 51 and the low-dimensional feature vector 53-1 for the negative image 15-1 become distant from each other, and the low-dimensional feature vector 53 for the reference image 51 and the low-dimensional feature vector 53-2 for the positive image 15-2 become close to each other. That is, the second artificial intelligence model 530 is trained to generate the low-dimensional feature vector 53-2 to be similar to the low-dimensional feature vector 53 for the reference image 51.

According to an embodiment, after training the second artificial intelligence module 530 with a suitable amount of data or greater (e.g., enough training data to return satisfactory results (e.g., results with a probability of greater than a threshold amount)), the electronic device may implement the second artificial intelligence module 530 to perform inference.

Figure 5C:
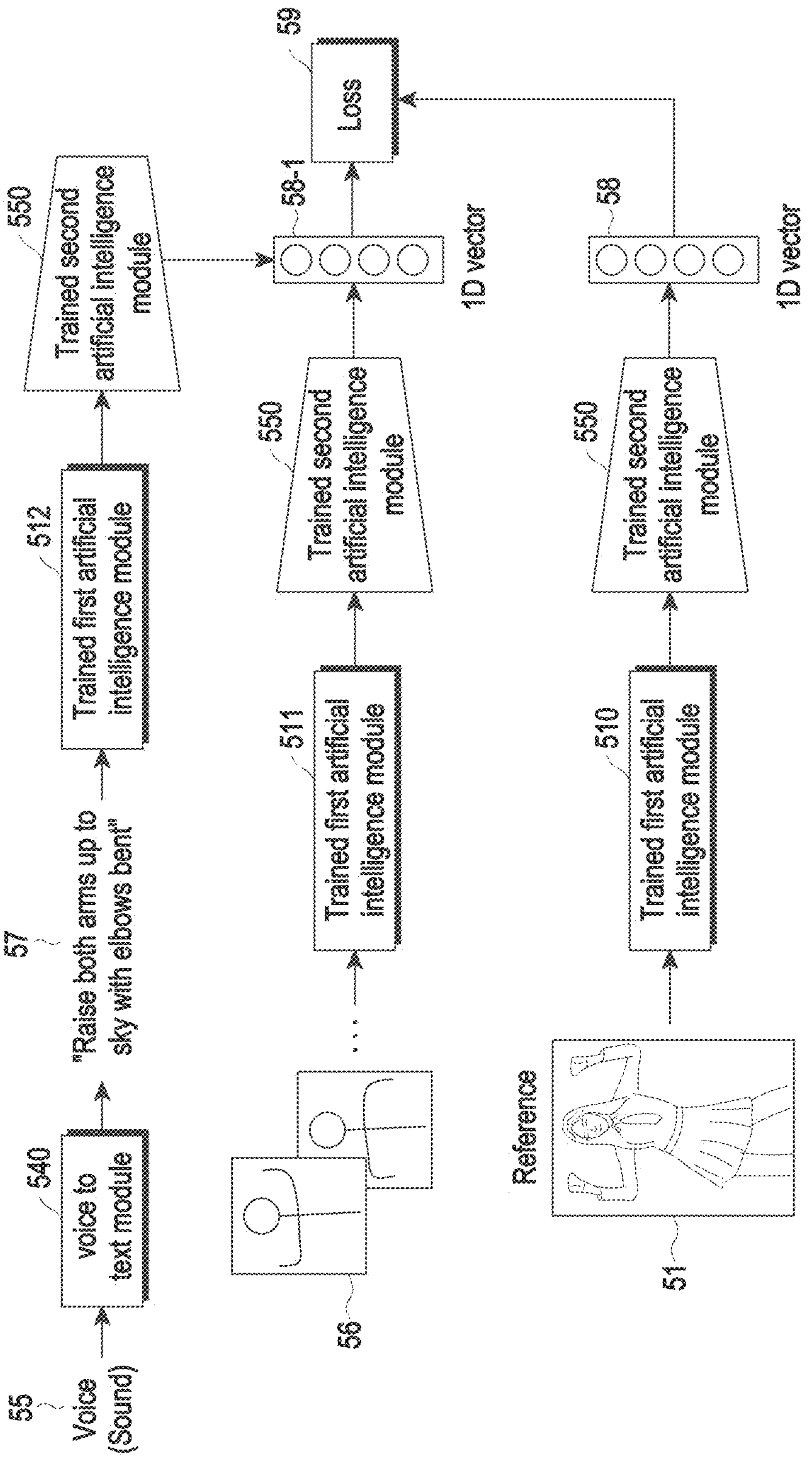
FIG. 5C illustrates an operation of training an artificial intelligence module to obtain feature information about a user-intended moment of an electronic device, according to an embodiment.

FIG. 5C illustrates an operation of training an artificial intelligence module to obtain feature information about a user-intended moment of an electronic device, according to an embodiment.

According to an embodiment, referring to FIG. 5C, the electronic device (e.g., the electronic device 101 of FIG. 1 or the processor 120 of FIG. 1) may train a first artificial intelligence module 510 using a sound, a drawing, or an image including similar features as input data.

According to an embodiment, the electronic device may input a reference image 51 to the first artificial intelligence module 510, and may input a target image output from the first artificial intelligence module 510 to a trained second artificial intelligence module 550. For example, the first artificial intelligence module 510 to which the reference image 51 is input may be an artificial intelligence network for transforming an image into a sketch. According to an embodiment, the trained second artificial intelligence module 550 may be trained as shown in FIG. 5B.

According to an embodiment, the electronic device may obtain, as a reference low-dimensional feature vector 58, a low-dimensional feature vector output from the trained second artificial intelligence module 550 using the reference image 51 as input data.

According to an embodiment, the electronic device may input a plurality of drawing images 56 to a first artificial intelligence module 511, and may input a target image output from the first artificial intelligence module 511 to a trained second artificial intelligence module 550. For example, the trained first artificial intelligence module 511 to which the drawing images 56 are input may be an artificial intelligence network for transforming a drawing image into a sketch. According to an embodiment, the trained second artificial intelligence module 550 may be trained as shown in FIG. 5B.

According to an embodiment, the electronic device may compare a low-dimensional feature vector 58-1 output from the trained second artificial intelligence module 550 using the drawing images 56 as input data with the reference low-dimensional feature vector 58, thereby obtaining a loss 59. According to an embodiment, the electronic device may train the trained first artificial intelligence module 511 for transforming the drawing images into a sketch, based on the loss 59.

According to an embodiment, the electronic device may input a user voice 55 to a voice-to-text module 540, thereby obtaining text 57 (e.g., "Raise both arms up to sky with elbows bent") corresponding to the user voice 55.

According to an embodiment, the electronic device may input the text 57 to a trained first artificial intelligence module 512, and may input a target image output from the first artificial intelligence module 512 to a trained second artificial intelligence module 550. For example, the first artificial intelligence module 512 to which the text 57 is input may be an artificial intelligence network for transforming text into a sketch. According to an embodiment, the trained second artificial intelligence module 550 may be trained as shown in FIG. 5B.

According to an embodiment, the electronic device may compare a low-dimensional feature vector 58-1 output from the trained second artificial intelligence module 550 using the text 57 as input data with the reference low-dimensional feature vector 58, thereby obtaining a loss 59. According to an embodiment, the electronic device may train the trained first artificial intelligence module 512 for transforming the text images into a sketch, based on the loss 59.

Figure 6:
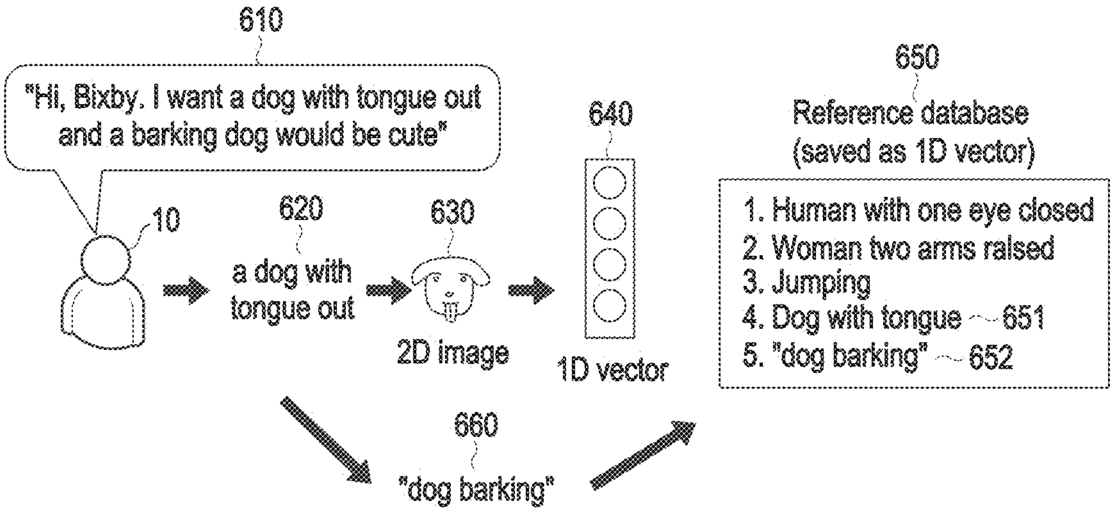
FIG. 6 illustrates an operation of obtaining feature information about a user-intended moment, based on the user's voice, according to an embodiment.

FIG. 6 illustrates an operation of obtaining feature information about a user-intended moment, based on the user's voice, according to an embodiment.

According to an embodiment, referring to FIG. 6, an electronic device (e.g., the electronic device 101 or the processor 120 of FIG. 1) may receive a user voice 610 saying "Hi, Bixby. I want a dog with tongue out and a barking dog would be cute" as information about an image capturing situation from a user 10.

According to an embodiment, the electronic device may transform the user voice 610 into text, and may obtain "a dog with tongue out" 620 as text related to a static situation included in the text and "a barking dog" as text related to a dynamic situation.

According to an embodiment, the electronic device may input "a dog with tongue out" 620 as the text related to the static situation to a first artificial intelligence module (e.g., the trained first artificial intelligence module 512), thereby obtaining a target image 630. For example, the first artificial intelligence module may be trained as shown in FIGS. 5A and/or 5C. For example, the target image 630 may be a 2D image, which may be a sketch image including a dog sticking out its tongue.

According to an embodiment, the electronic device may input the target image 630 to a second artificial intelligence module (e.g., the trained second artificial intelligence module 550), thereby obtaining a low-dimensional (e.g., one-dimensional) feature vector 640. For example, the second artificial intelligence module may be trained as shown in FIG. 5B.

According to an embodiment, the electronic device may store the low-dimensional feature vector 640 in a reference database 650. For example, the electronic device may store the low-dimensional feature vector 640 as an item "dog with tongue" 651 in the reference database 650.

According to an embodiment, the electronic device may obtain a label "dog barking" 660 related to a target sound, based on "a barking dog" as the text related to the dynamic situation.

According to an embodiment, the electronic device may store the label "dog barking" 660 as an item "dog barking" 652 in the reference database 650.

Figure 7:
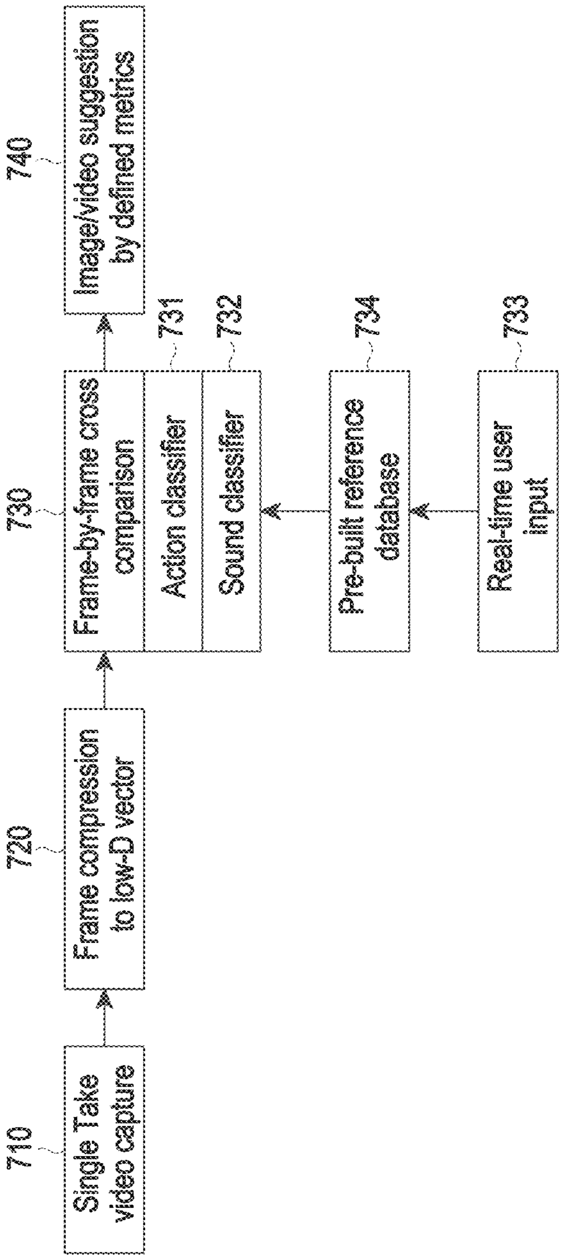
FIG. 7 illustrates an operation of obtaining an image or a video at a user-intended moment in a single-take mode according to an embodiment.

FIG. 7 illustrates an operation of obtaining an image or a video at a user-intended moment in a single-take mode according to an embodiment.

According to an embodiment, referring to FIG. 7, in operation 710, an electronic device (e.g., the electronic device 101 of FIG. 1 or the processor 120 of FIG. 1) may capture a video in a single-take mode. For example, the single-take mode may refer to a function of collecting a plurality of frames for a predetermined time specified by a user and extracting a plurality of images or videos according to a configured criterion.

According to an embodiment, in operation 720, the electronic device may compress the obtained frames captured in operation 710 into low-dimensional vectors.

According to an embodiment, in operation 730, the electronic device may compare feature information for each of the obtained frames. For example, the electronic device may identify whether feature information is included in each acquired frame using an action classifier 731 and/or a sound classifier 732.

According to an embodiment, the feature information may be obtained from a pre-built reference database in operation 734, based on information about an image capturing situation input from the user in real time in operation 733. For example, the reference database may be the reference database established by operation 314 of FIG. 3 and/or the reference database 650 of FIG. 6.

According to an embodiment, in operation 740, the electronic device may suggest an image and/or a video according to predefined metrics. For example, the electronic device may extract at least one frame including a feature stored in the reference database among the plurality of frames collected for a predetermined time and may store the frame or may suggest the frame to the user.

Accordingly, an image obtaining operation according to the disclosure has an effect of adding a new feature defined by a user without affecting a pipeline of an existing single-take mode.

Figure 8:
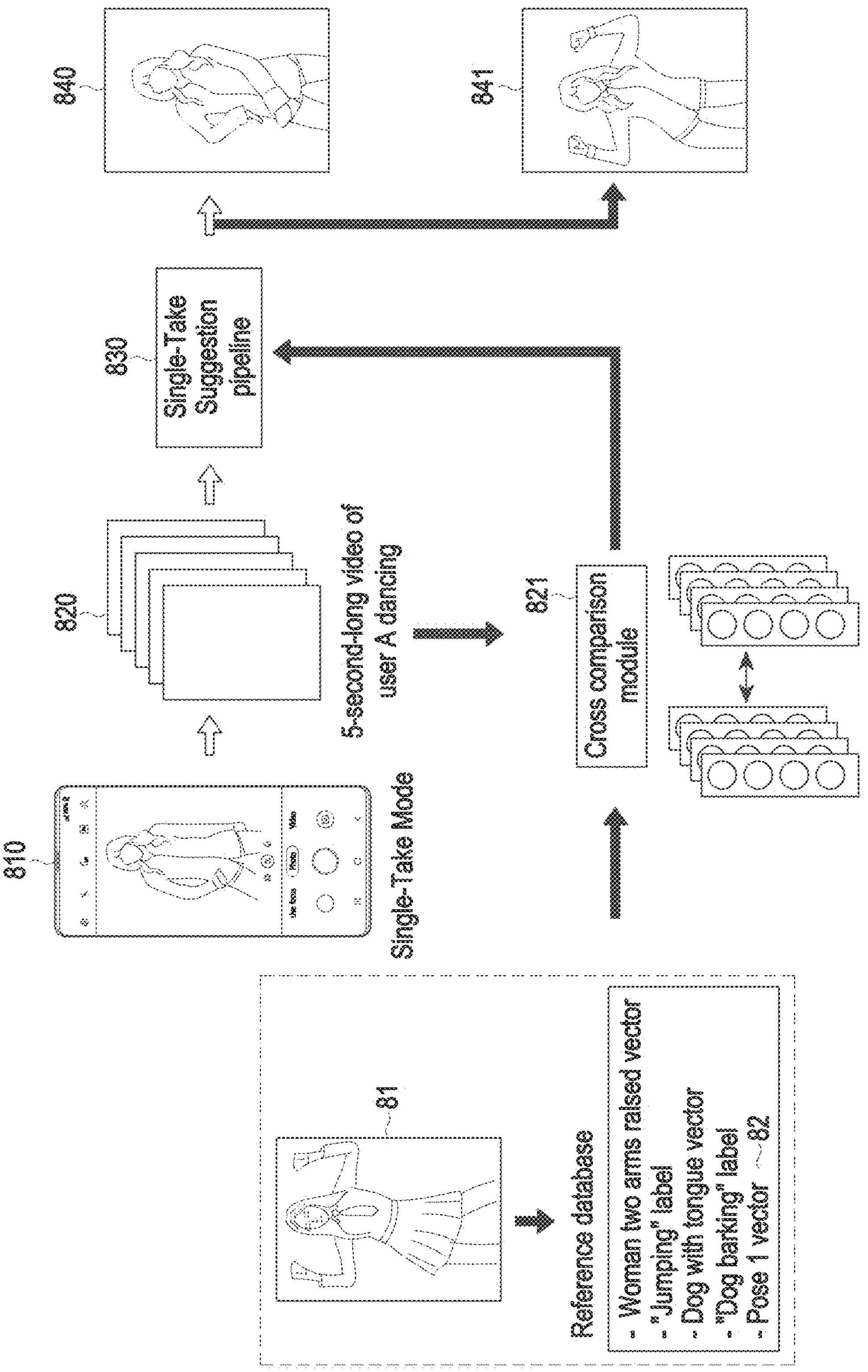
FIG. 8 illustrates an operation of obtaining an image at a user-intended moment in a single-take mode according to an embodiment.

FIG. 8 illustrates an operation of obtaining an image at a user-intended moment in a single-take mode according to an embodiment.

According to an embodiment, referring to FIG. 8, an electronic device (e.g., the electronic device 101 of FIG. 1 or the processor 120 of FIG. 1) may execute a camera application by a user manipulation, and may obtain a plurality of frames 820 for a period designated by the user through a single-take mode 810. For example, the period designated by the user may be substantially five seconds (or another suitable period of time) after the user selects a shutter button for image capturing.

According to an embodiment, the electronic device may provide the user with an image satisfying a configured condition among the plurality of frames 820 through a single-take suggestion pipeline 830. For example, when the configured condition is such that a frame has no blur and has good color and composition, the electronic device may suggest a frame 840 satisfying the condition among the plurality of frames 820.

According to an embodiment, when information about a user-intended moment is stored by the user, the electronic device may further suggest a frame including information of the user-intended moment to the user.

According to an embodiment, when the user inputs a reference image 81, the electronic device may store a pose 1 vector 82 which is feature information of the reference image 81, based on the reference image 81. For example, the electronic device may obtain and store the pose 1 vector 82 which is the feature information of the reference image 81 using the first artificial intelligence module 510 shown in FIG. 5A and the second artificial intelligence module 530 shown in FIG. 5B.

According to an embodiment, the electronic device may transform a feature of each of the plurality of frames 820 into a low-dimensional feature vector, and may compare, at block 821, the low-dimensional feature vector of each of the plurality of frames 820 with pieces of feature information stored in a reference database.

According to an embodiment, the electronic device may further suggest a frame 841 including feature information stored in the reference database to the user through the single-take suggestion pipeline 830. For example, the electronic device may further suggest the frame 841 including a pose of raising both arms which is a feature of the reference image 81 input by the user to the user.

Figure 9:
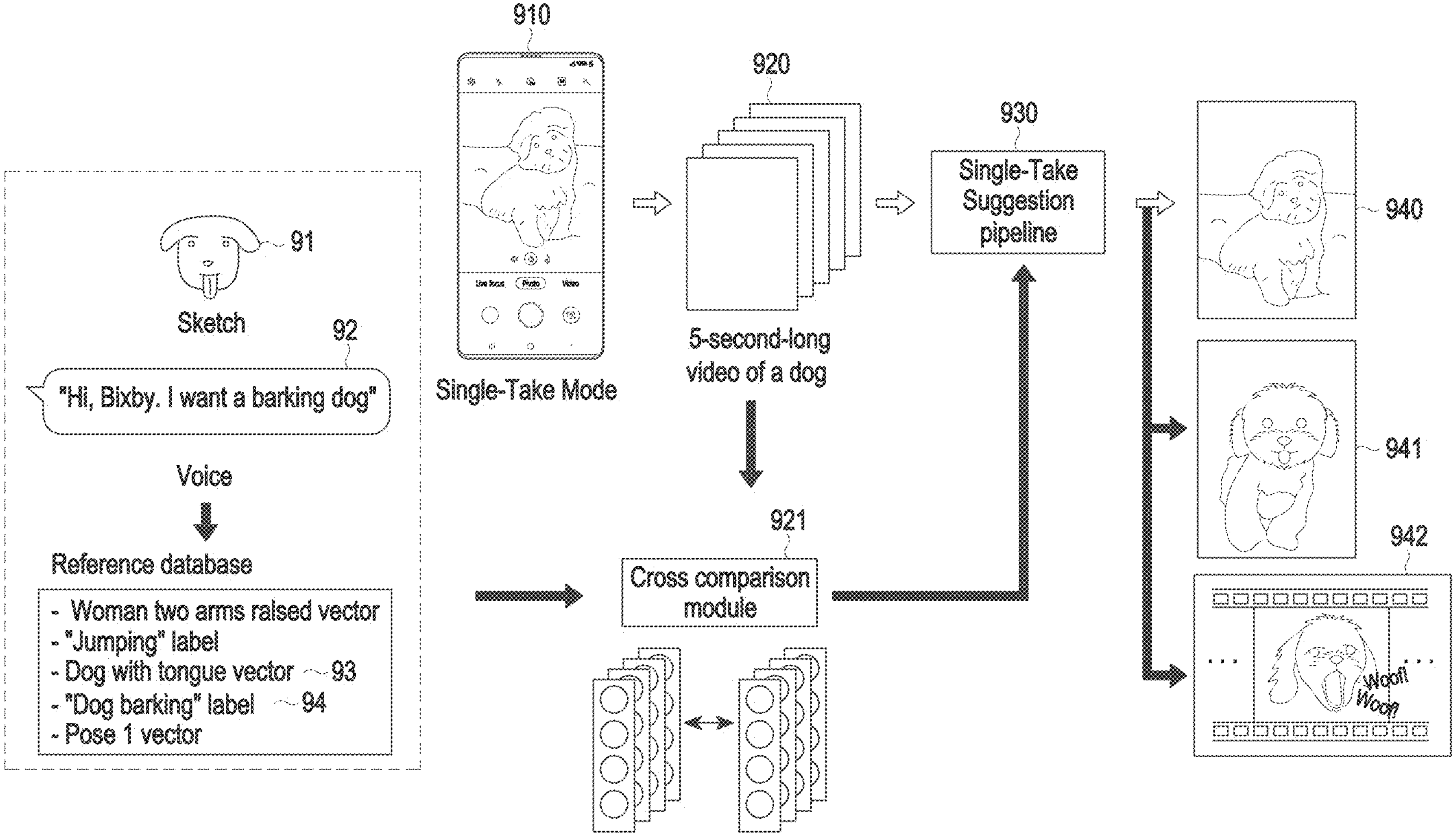
FIG. 9 illustrates an operation of obtaining an image and a video at a user-intended moment in a single-take mode according to an embodiment.

FIG. 9 illustrates an operation of obtaining an image and a video at a user-intended moment in a single-take mode according to an embodiment.

According to an embodiment, referring to FIG. 9, an electronic device (e.g., the electronic device 101 of FIG. 1 or the processor 120 of FIG. 1) may execute a camera application by a user manipulation, and may obtain a plurality of frames 920 for a period designated by the user through a single-take mode 910. For example, the period designated by the user may be substantially five seconds (or another suitable period of time) after the user selects a shutter button for image capturing.

According to an embodiment, the electronic device may provide the user with an image satisfying a configured condition among the plurality of frames 920 through a single-take suggestion pipeline 930. For example, when the configured condition is such that a frame has no blur and has good color and composition, the electronic device may suggest a frame 940 satisfying the condition among the plurality of frames 920.

According to an embodiment, when information about a user-intended moment is stored by the user, the electronic device may further suggest a frame including information of the user-intended moment to the user.

According to an embodiment, when the user inputs a drawing (sketch 91) or a user voice 92 (e.g., "Hi, Bixby. I want a barking dog"), the electronic device may store feature information 'dog with tongue vector' 93 or 'dog barking label' 94, based on the sketch 91 or the user voice 92. For example, the electronic device may obtain and store the feature information 'dog with tongue vector' 93 of the drawing image 91 using the first artificial intelligence module 510 shown in FIG. 5A and the second artificial intelligence module 530 shown in FIG. 5B.

According to an embodiment, the electronic device may transform a feature of each of the plurality of frames 920 into a low-dimensional feature vector, and may compare, at block 921, the low-dimensional feature vector of each of the plurality of frames 920 with pieces of feature information stored in a reference database.

According to an embodiment, the electronic device may further suggest a frame 941 or a video 942 including feature information stored in the reference database to the user through the single-take suggestion pipeline 930. For example, the electronic device may further suggest, to the user, an image 941 of a dog sticking out its tongue input by a user via the sketch 91 and a video 942 of a dog barking input by the user via the user voice 92.

Figure 10:
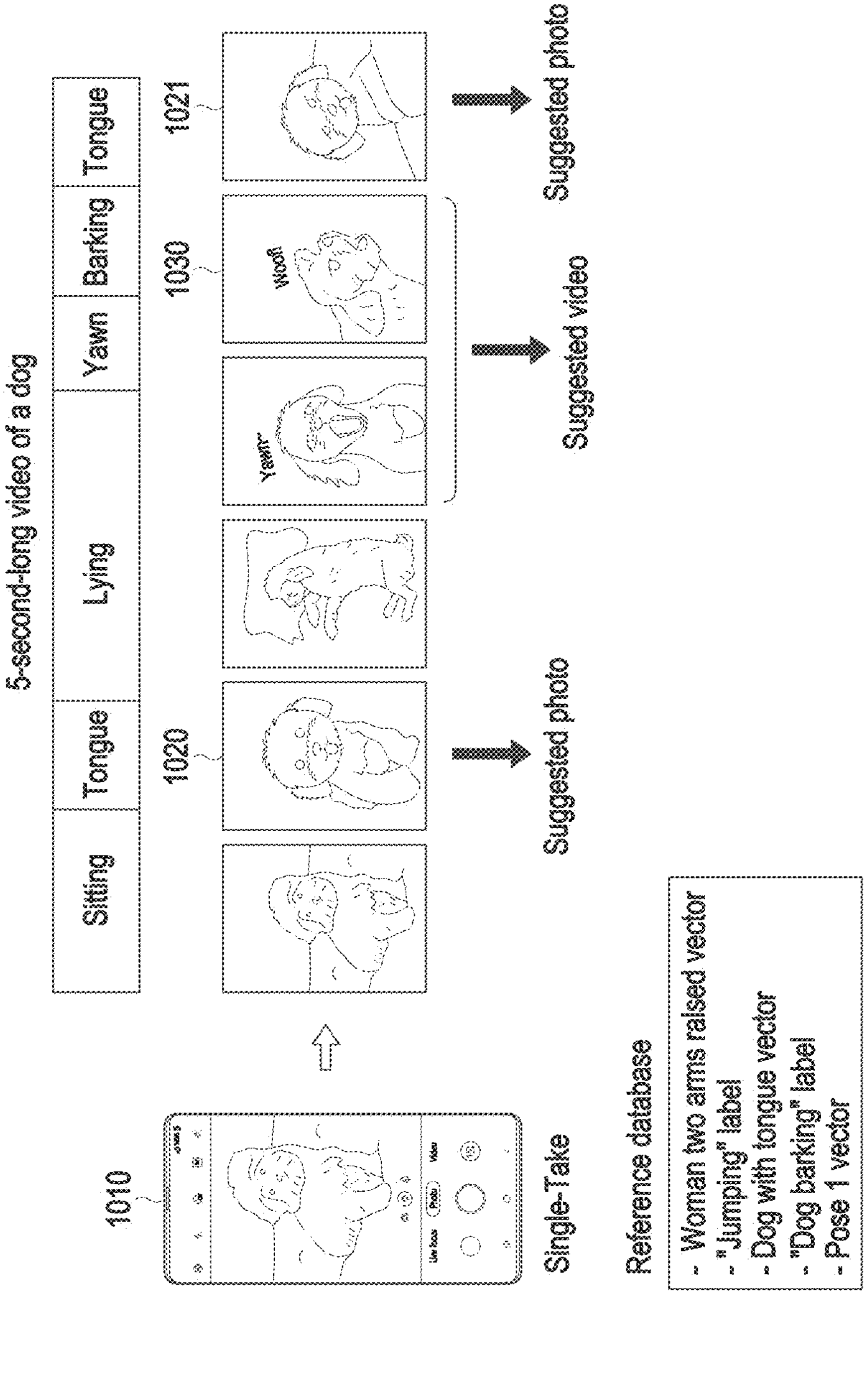
FIG. 10 illustrates an operation of obtaining an image and a video at a user-intended moment in a single-take mode according to an embodiment.

FIG. 10 illustrates an operation of obtaining an image and a video at a user-intended moment in a single-take mode according to an embodiment.

According to an embodiment, referring to FIG. 10, an electronic device (e.g., the electronic device 101 of FIG. 1 or the processor 120 of FIG. 1) may store the frames for substantially five seconds (or another suitable period of time) after a shutter button is selected in a buffer through a single-take mode of a camera application. For example, a plurality of frames obtained for five seconds after the shutter button is selected may sequentially include a dog sitting, a dog sticking out its tongue, a dog lying down, a dog yawning, a dog barking, and a dog sticking out its tongue as shown.

According to an embodiment, the electronic device may obtain images 1020 and 1021 of a dog sticking out its tongue and a video 1030 of a dog barking, based on "dog with tongue vector" and "dog barking vector" stored in a reference database, and may store the images 1020 and 1021 and the video 1030 in a memory (e.g., the memory 130 of FIG. 1) or may provide the same to a user through a touchscreen (e.g., the display module 160 of FIG. 1) or other suitable display.

Figure 11:
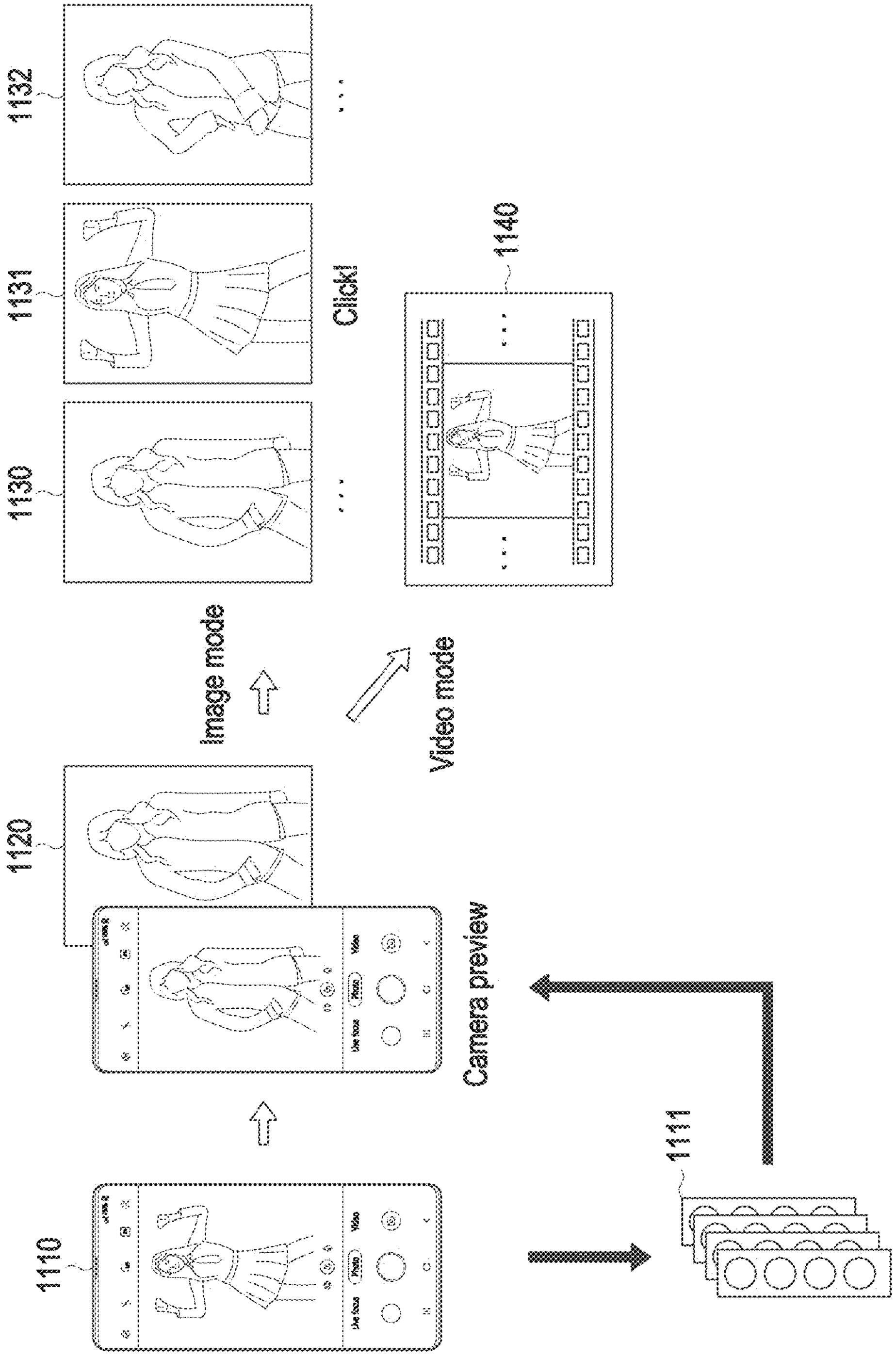
FIG. 11 illustrates an operation of obtaining an image and a video at a user-intended moment through a preview of a camera application according to an embodiment.

FIG. 11 illustrates an operation of obtaining an image and a video at a user-intended moment through a preview of a camera application according to an embodiment.

According to an embodiment, referring to FIG. 11, an electronic device (e.g., the electronic device 101 of FIG. 1 or the processor 120 of FIG. 1) may display an execution screen of a camera application by a user manipulation, and a user may select a reference image 1110 through the execution screen of the camera application.

According to an embodiment, when the user inputs the reference image 1110, the electronic device may obtain or store a pose 1 vector 1111 which is feature information of the reference image 1110, based on the reference image 1110. For example, the electronic device may obtain and store the pose 1 vector 1111 which is the feature information of the reference image 1110 using the first artificial intelligence module 510 shown in FIG. 5A and the second artificial intelligence module 530 shown in FIG. 5B.

According to an embodiment, when a frame including the pose 1 vector 1111 stored by the user input is identified in a preview 1120 of the camera application, the electronic device may automatically operate a shutter button for obtaining an image, or may automatically operate a shutter button for obtaining a video.

According to an embodiment, in a case of operating in an image mode, when identifying a frame 1131 including the pose 1 vector 111 while identifying frames 1130, 1131, and 1132 respectively including a plurality of poses of the user through the preview 1120, the electronic device may automatically operate the shutter button to store the frame 1131 including the pose 1 vector 1111.

According to an embodiment, in a case of operating in a video mode, when identifying a frame including the pose 1 vector 1111 through the preview 1120, the electronic device may automatically operate the shutter button to take a video 1140 starting from the frame including the pose 1 vector 1111 for a configured time.

Figure 12:
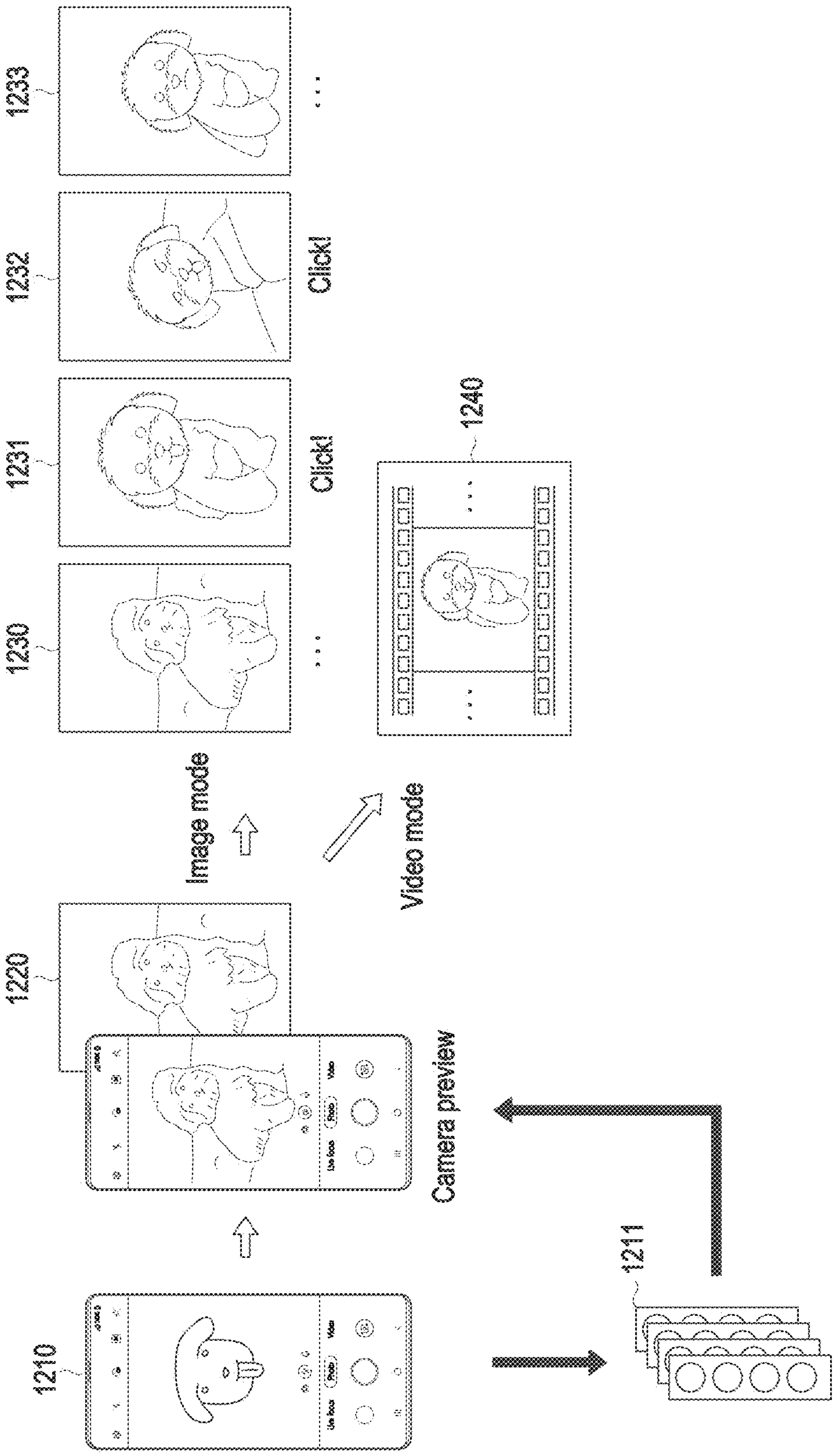
FIG. 12 illustrates an operation of obtaining an image and a video at a user-intended moment through a preview of a camera application according to an embodiment.

FIG. 12 illustrates an operation of obtaining an image and a video at a user-intended moment through a preview of a camera application according to an embodiment.

According to an embodiment, referring to FIG. 12, an electronic device (e.g., the electronic device 101 of FIG. 1 or the processor 120 of FIG. 1) may display an execution screen of a camera application by a user manipulation, and a user may obtain a drawing image 1210 by the user drawing through the execution screen of the camera application.

According to an embodiment, when the drawing image 1210 is obtained, the electronic device may obtain or store a 'tongue-sticking-out dog vector' 1211 which is feature information of the drawing image 1210, based on the drawing image 1210. For example, the electronic device may obtain and store the 'tongue-sticking-out dog vector' 1211 which is the feature information of the drawing image 1210 using the first artificial intelligence module 510 shown in FIG. 5A and the second artificial intelligence module 530 shown in FIG. 5B.

According to an embodiment, when a frame including the 'tongue-sticking-out dog vector' 1211 stored by a user input is identified in a preview 1220 of the camera application, the electronic device may automatically operate a shutter button for obtaining an image, or may automatically operate a shutter button for obtaining a video.

According to an embodiment, in a case of operating in an image mode, when identifying frames 1231 and 1232 including the 'tongue-sticking-out dog vector' 1211 while identifying frames 1230, 1231, 1232, and 1233 respectively including a plurality of poses of a dog through the preview 1220, the electronic device may automatically operate the shutter button to store the frames 1231 and 1232 including the 'tongue-sticking-out dog vector' 1211.

According to an embodiment, in a case of operating in a video mode, when identifying a frame including the 'tongue-sticking-out dog vector' 1211 through the preview 1220, the electronic device may automatically operate the shutter button to take a video 1240 starting from the frame including the 'tongue-sticking-out dog vector' 1211 for a configured time.

According to an embodiment, an electronic device (e.g., the electronic device 101 of FIG. 1) may include a camera (e.g., the camera module 180 of FIG. 1), a memory (e.g., the memory 130 of FIG. 1), and a processor (e.g., the processor 120 of FIG. 1), wherein the processor may receive information about an image capturing situation from a user, may obtain a target image based on the information about the image capturing situation using a first artificial intelligence module stored in the memory, may obtain feature information included in the target image using a second artificial intelligence module stored in the memory, may store the feature information in the memory, and may store an image related to the feature information in the memory when obtaining the image related to the feature information through the camera.

According to an embodiment, the processor may display the target image on a touchscreen (e.g., the display module 160 of FIG. 1).

According to an embodiment, the processor may edit the target image based on a user manipulation for editing the target image displayed on the touchscreen when receiving the user manipulation, and may obtain feature information of the edited target image using the second artificial intelligence module.

According to an embodiment, the processor may receive the information about the image capturing situation through at least one of a voice input of the user, a drawing input of the user, or an image input.

According to an embodiment, the processor may store at least one of a target sound or a target action in the memory when the information about the image capturing situation further includes at least one of the target sound or the target action, and may store a video related to at least one of the target sound or the target action in the memory when obtaining the video through the camera.

According to an embodiment, the processor may classify at least one of a sound or an action included in a plurality of frames obtained through a preview of a camera application, and may obtain the video through similarity between at least one of the classified sound or action and the of the target sound or the target action.

According to an embodiment, the processor may classify at least one of a sound or an action included in a plurality of frames stored in the memory, and may obtain the video through similarity between at least one of the classified sound or action and the at least one of the target sound or the target action.

According to an embodiment, the processor may obtain the image related to the feature information among a plurality of frames obtained through a preview of a camera application.

According to an embodiment, the processor may obtain the image related to the feature information among a plurality of frames stored in the memory.

According to an embodiment, the feature information may include a one-dimensional feature vector.

According to an embodiment, a method for controlling an electronic device may include receiving information about an image capturing situation from a user, obtaining a target image based on the information about the image capturing situation using a first artificial intelligence module stored in a memory, obtaining feature information included in the target image using a second artificial intelligence module stored in the memory, storing the feature information in the memory, and storing an image related to the feature information in the memory when obtaining the image related to the feature information through a camera.

According to an embodiment, the method may further include displaying the target image on a touchscreen and editing the target image based on a user manipulation for editing the target image displayed on the touchscreen when receiving the user manipulation, wherein the obtaining of the feature information may include obtaining feature information of the edited target image using the second artificial intelligence module.

According to an embodiment, the receiving may include receiving the information about the image capturing situation through at least one of a voice input of the user, a drawing input of the user, or an image input.

According to an embodiment, the method may further include storing at least one of a target sound or a target action in the memory when the information about the image capturing situation further includes at least one of the target sound or the target action, and storing a video related to at least one of the target sound or the target action in the memory when obtaining the video through the camera.

According to an embodiment, the storing of the video in the memory may include classifying at least one of a sound or an action included in a plurality of frames obtained through a preview of a camera application, and obtaining the video through similarity between at least one of the classified sound or action and the at least one of the target sound or the target action.

According to an embodiment, the storing of the video in the memory may include classifying at least one of a sound or an action included in a plurality of frames stored in the memory, and obtaining the video through similarity between at least one of the classified sound or action and the at least one of the target sound or the target action.

According to an embodiment, the storing the image in the memory may include obtaining the image related to the feature information among a plurality of frames obtained through a preview of a camera application.

According to an embodiment, the storing the image in the memory may include obtaining the image related to the feature information among a plurality of frames stored in the memory.

According to an embodiment, the feature information may include a one-dimensional feature vector.

According to an embodiment, a method may include: capturing a video in a single-take mode, the single take mode collecting a plurality of frames for a predetermined time, compressing the plurality of frames into low-dimensional vectors, comparing feature information for each of the plurality of frames, wherein the feature information is obtained from a reference database based on information about an image capturing situation input from a user, extracting at least one frame including a feature stored in the reference database among the plurality of frames collected for the predetermined time, and storing the extracted at least one frame or suggesting the extracted at least one frame to the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a camera;

a display;

at least one processor; and memory storing instructions that, when executed by the at least one processor individually or collectively, cause the electronic device to:

obtain a target image based on information about an image desired to be captured;

obtain reference feature information from the target image by inputting the target image to an artificial intelligence module;

obtain a plurality of image frames;

obtain a plurality of feature information from the plurality of image frames;

based on comparing the plurality of feature information and the reference feature information, obtain an image frame corresponding to the reference feature information among the plurality of image frames; and display the obtained image frame as a recommended image frame on the display.

2. The electronic device of claim 1, wherein the instructions, when executed by the at least one processor individually or collectively, cause the electronic device to:

receive, from a user, the information about the image desired to be captured; and obtain, using the artificial intelligence module, the target image based on the information about the image desired to be captured.

3. The electronic device of claim 1, wherein the plurality of image frames are obtained within a set time after a shutter operates.

4. The electronic device of claim 1, wherein the reference feature information further includes at least one of a target sound or a target action, and wherein the instructions, when executed by the at least one processor individually or collectively, cause the electronic device to:

classify at least one of a sound or an action included in the plurality of image frames; and obtain a video through similarity between at least one of the classified sound or action and the at least one of the target sound or the target action.

5. The electronic device of claim 1, wherein the instructions, when executed by the at least one processor individually or collectively, cause the electronic device to:

display a reference image on the display;

based on receiving a user input for editing the reference image displayed on the display, edit the reference image, and obtain the reference feature information from the edited reference image.

6. The electronic device of claim 1, wherein the reference feature information includes a reference feature vector, and wherein the instructions, when executed by the at least one processor individually or collectively, cause the electronic device to:

based on comparing feature vectors of the plurality of image frames to the reference feature vector, obtain the image frame corresponding to the reference feature information among the plurality of image frames.

7. A method for controlling an electronic device, the method comprising:

obtaining a target image based on information about an image desired to be captured;

obtaining reference feature information from the target image by inputting the target image to an artificial intelligence module;

obtaining a plurality of image frames;

obtaining a plurality of feature information from the plurality of image frames;

based on comparing the plurality of feature information and the reference feature information, obtaining an image frame corresponding to the reference feature information among the plurality of image frames; and displaying the obtained image frame as a recommended image frame on a display of the electronic device.

8. The method of claim 7, wherein the reference feature information includes a reference feature vector, and wherein the image frame is obtained based on comparing feature vectors of the plurality of image frames to the reference feature vector.

9. The method of claim 7, further comprising:

receiving, from a user, the information about the image desired to be captured, wherein the target image is obtained, using the artificial intelligence module, based on the information about the image desired to be captured.

10. The method of claim 7, wherein the plurality of image frames are obtained within a set time after a shutter operates.

11. The method of claim 7, wherein the reference feature information further includes at least one of a target sound or a target action, and wherein the method further comprises:

classifying at least one of a sound or an action included in the plurality of image frames; and obtaining a video through similarity between at least one of the classified sound or action and the at least one of the target sound or the target action.

12. The method of claim 7, further comprising:

displaying a reference image on the display; and based on receiving a user input for editing the reference image displayed on the display, editing the reference image, wherein the reference feature information is obtained from the edited reference image.

13. One or more non-transitory computer-readable storage media storing computer-executable instructions that, when executed by at least one processor of an electronic device, cause the electronic device to perform operations, the operations comprising:

obtaining a target image based on information about an image desired to be captured;

obtaining reference feature information from the target image by inputting the target image to an artificial intelligence module;

obtaining a plurality of image frames;

obtaining a plurality of feature information from the plurality of image frames;

based on comparing the plurality of feature information and the reference feature information, obtaining an image frame corresponding to the reference feature information among the plurality of image frames; and displaying the obtained image frame as a recommended image frame on a display of the electronic device.

14. The one or more non-transitory computer-readable storage media of claim 13, the operations further comprising:

receiving, from a user, the information about the image desired to be captured, wherein the target image is obtained, using the artificial intelligence module, based on the information about the image desired to be captured.

15. The one or more non-transitory computer-readable storage media of claim 13, wherein the plurality of image frames are obtained within a set time after a shutter operates.

16. The one or more non-transitory computer-readable storage media of claim 13, wherein the reference feature information further includes at least one of a target sound or a target action, and wherein the operations further comprise:

classifying at least one of a sound or an action included in the plurality of image frames; and obtaining a video through similarity between at least one of the classified sound or action and the at least one of the target sound or the target action.

17. The one or more non-transitory computer-readable storage media of claim 13, the operations further comprising:

displaying a reference image on the display; and based on receiving a user input for editing the reference image displayed on the display, editing the reference image, wherein the reference feature information is obtained from the edited reference image.

18. The one or more non-transitory computer-readable storage media of claim 13, wherein the reference feature information includes a reference feature vector, and wherein the image frame is obtained based on comparing feature vectors of the plurality of image frames to the reference feature vector.

* * * * *